(12) United States Patent
Collette, III et al.

(10) Patent No.: US 7,882,049 B2
(45) Date of Patent: Feb. 1, 2011

(54) PROCESS CONTROL SYSTEM USING SPATIALLY DEPENDENT DATA FOR CONTROLLING A WEB-BASED PROCESS

(75) Inventors: L. Paul Collette, III, Westminster, MA (US); W. Douglas Johnson, Austin, TX (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 146 days.

(21) Appl. No.: 12/194,440

(22) Filed: Aug. 19, 2008

(65) Prior Publication Data

US 2008/0300709 A1 Dec. 4, 2008

Related U.S. Application Data

(63) Continuation of application No. 11/129,062, filed on May 13, 2005, now Pat. No. 7,526,463.

(51) Int. Cl.
G06F 15/18 (2006.01)
G06N 5/00 (2006.01)

(52) U.S. Cl. .............................. 706/15; 706/12; 706/21

(58) Field of Classification Search ........................ None
See application file for complete search history.

(56) References Cited

U.S. PATENT DOCUMENTS

| | | | |
|---|---|---|---|
| 5,121,467 A | 6/1992 | Skeirik | |
| 5,805,453 A | 9/1998 | Sasaki | |
| 5,812,404 A | 9/1998 | Hamalainen et al. | |
| 5,930,136 A | 7/1999 | Nakajima et al. | |

(Continued)

FOREIGN PATENT DOCUMENTS

GB 2283940 5/1995

OTHER PUBLICATIONS

P. J. Edwards, et al., "Paper curl prediction—neural networks applied to the papermaking industry"; Ninth International Conference on Artificial Neural Networks; 1999; pp. 335-340; vol. 1; Edinburgh, UK.

(Continued)

*Primary Examiner*—Michael B. Holmes
*Assistant Examiner*—Adrian L Kennedy
(74) *Attorney, Agent, or Firm*—Fletcher Yoder LLP; William R. Walbrun; John M. Miller

(57) ABSTRACT

System and method for controlling a process with spatially dependent conditions for producing a product with spatially dependent properties, e.g., a web/sheet-based process for producing a web/sheet-based product. Input data comprising a plurality of input data sets are provided to a neural network (analog or computer-based), each data set comprising values for one or more input parameters, each comprising a respective process condition or product property. The input data preserve spatial relationships of the input data. The neural network generates output data in accordance with the input data, the output data comprising a plurality of output data sets, each comprising values for one or more output parameters, each comprising a predicted process condition or product property. The output data preserve spatial relationships of the output data, which correspond to the spatial relationships of the input data. The output data are useable by a controller or operator to control the process.

20 Claims, 13 Drawing Sheets

U.S. PATENT DOCUMENTS

| | | |
|---|---|---|
| 6,421,575 B1 | 7/2002 | Shakespeare |
| 6,718,234 B1 | 4/2004 | Demoro et al. |
| 6,743,337 B1 | 6/2004 | Ischdonat |
| 6,753,965 B2 | 6/2004 | Kumar et al. |
| 6,915,180 B2 | 7/2005 | Sasaki |
| 6,985,779 B2 | 1/2006 | Hsiung et al. |
| 2002/0011319 A1 | 1/2002 | Shakespeare et al. |
| 2003/0046130 A1* | 3/2003 | Golightly et al. ............... 705/7 |
| 2003/0050728 A1 | 3/2003 | Sarabi et al. |
| 2004/0267395 A1* | 12/2004 | Discenzo et al. ............. 700/99 |
| 2005/0038538 A1 | 2/2005 | McDonald et al. |

OTHER PUBLICATIONS

Jukka Vanhala et al., "Paper Web Quality Profile Analysis Tool Based on Artificial Neural Networks", Fifth International Conference on Tools with Artificial Intelligence; Nov. 1993; pp. 343-346; Boston, MA.

International Search Report and Written Opinion for application No. PCT/US206/018496 mailed Oct. 6, 2006.

* cited by examiner

PROCESS CONTROL SYSTEM USING SPATIALLY DEPENDENT DATA FOR CONTROLLING A WEB-BASED PROCESS

CROSS-REFERENCE TO RELATED APPLICATIONS

This application is a continuation of application Ser. No. 11/129,062, filed May 13, 2005, entitled "Neural Network Using Spatially Dependent Data For Controlling A Web-Based Process" in the name of L. Paul Collette, III et al.

BACKGROUND OF THE INVENTION

1. Field of the Invention

The present invention relates to the measurement and control of manufacturing processes that produce web or sheet based products, and more specifically, to use of a neural network with spatially dependent data in the control of such processes.

2. Description of the Related Art

The quality of a manufactured product can often be more financially critical than the quantity that is produced. There are many standards worldwide that provide guidelines for quality assurance between suppliers and customers. Maintaining standards of quality for a product may require consideration of the specific properties of the product, as well as the product's final use. The quality of a product is the result of the physical integration of all the raw materials, equipment, and process and operator manipulations occurring during its manufacture.

Process control can be generalized as the collection of methods used to produce the best possible product properties and process economies during the manufacturing process. Many manufacturing processes fall into one of two categories based on the spatial or dimensional dependence of product properties—longitudinal or bulk manufacturing; and web or sheet based manufacturing. Longitudinal or bulk products can be considered dimensionally homogenous and can be measured or characterized with bulk properties. Examples include plastic dowels, polymer threads, fluids, and so forth. Web-based products can be measured or characterized with spatially dependant properties. Examples include rolls and sheets of plastic, paper, or other fibers, minerals and wood products, and even some food products. Note that as used herein, the term "sheet" may refer to both flat products and rolled products.

The challenges associated with web-based products require special consideration for the manufacturing process conditions and the product properties due to the dimensional nature of web-based products. Improper control of process conditions in web-based processes, in either the direction of manufacture or across the direction of manufacture, can result in products that are of little or no value to the final customer. In these situations the manufacturer will lose profit opportunity due to the need to recycle and remanufacture the product, or sell the product at a lower price. Many customers purchase web-based products for use as a raw material in their own processes, which then convert the web product into final end user consumer products. Less than first quality web-based products are not typically accepted by customers. The ability to effectively control web based processes and web-based product properties plays a significant role in determining the profitability of manufacturing operations.

Quality and Process Conditions for General Process Control

FIG. 1 illustrates key concepts of a typical manufacturing process in generalized block diagram form. As FIG. 1 shows, raw materials 102 are transformed by a process 104 under controlled process conditions into products 106 with desired properties. FIG. 1 also presents exemplary raw materials, process conditions, and product properties for typical manufacturing processes. For example, raw materials 102 may include such bulk feed materials as chemicals, fibers, minerals, energy, and parts or components, among others. Process conditions may include such operating parameters as flow, pressure, temperature, humidity, as well as speed, rate, and feed properties, among others. Example product properties related to quality may include weight, color, strength, composition, texture, and so forth.

Controlling Process Conditions

FIG. 2 shows a more detailed representation of the manufacturing process as it relates to the production of products with specific desired properties. More specifically, FIG. 2 provides a simplified overview of various aspects of a manufacturing process, where the effective operation of the process requires that the process conditions be maintained at one or more condition set points so that the product produced will have the product properties matching the desired product property targets.

As shown in FIG. 2, various raw materials 208 may be provided to a process 210 with various process conditions, including controllable process conditions, i.e., controller/actuator parameters, where the process produces a product 212 with various product properties. The process 210 may be controlled in accordance with process condition target values 202, which may be initialized with initial process condition targets, as shown, but which may be adjusted based on feedback from measured process and property data. As may be seen, product property measurement(s) 206 may be analyzed with respect to product property target value(s) 204, and an adjustment of process condition targets determined and applied in to the process condition target values 202. As also shown, measurement(s) of process conditions may be analyzed with respect to the process condition target values 202, and adjustments of controllable process conditions made to the process accordingly. Thus, the various components of the system may operate in conjunction via feedback mechanisms to control the process to produce a product with desired properties.

The automation of manufacturing process controls allows the production of products from complex manufacturing processes that cannot be controlled by manual operation. In addition to manufacturing products at higher rates that are more economically favorable, automatic process controls allow the products to achieve more desirable product properties, more consistently. These three factors: more production throughput, more desirable product properties, and a more economical operation, form the basis of process control, which can be summarized as utilizing scientific methods to gain economic leverage over the manufacturing process.

The process control tasks shown in FIG. 2 can be generalized into five steps that apply to both manufacturing processes for products that are both longitudinal or bulk and web-based. It should be noted that the general nature of these descriptions is not intended to ignore or oversimplify the efforts necessary to control the process conditions and product properties of every manufacturing process.

1) Setting of the initial process condition set points
2) Producing process condition measurements of the process conditions 3) Adjusting the controllable process states in response to process condition measurements 4) Producing product property measurements based on product properties of the manufactured product 5) Adjusting the process condition set points to in response to the product property measurements.

Steps 2 and 4 involve measurements of process conditions and measurements of product properties necessary for control and financial success of the manufacturing operation.

Thus, as FIG. 2 indicates, the manufactured product is defined by one of more product properties, where each product property is quantified by a specific measurement, and the manufacturing process is operated to produce the targeted level of each product property as determined by its specific measurement. Each specific product property, contributes to the overall value of the manufactured product. As also shown, the product property target values, as well as process condition measurements (and initial process condition targets), determine process condition target values, which in turn may be used to adjust controllable process conditions of the process. Thus, the interplay of measured and target product properties, measured and target process conditions, and adjustments made thereto, gives rise to a feedback system whereby the quality of the final product may be tuned and maintained to desirable ends.

FIG. 3 illustrates a system representative of most manufacturing processes, where the end use and desired properties of the products produced determine the specific nature of the process and controls used to adjust the process. In other words, the physical nature of the product being produced can dictate process design, raw material configuration and the controls required to achieve the final product properties.

The example of plastic dowel extrusion shown in FIG. 3 is a simplified prior art longitudinal or bulk process presented here for illustration purposes, although the general concepts described apply to more complex manufacturing processes, as well. As may be seen, raw materials 102 (such as plastic pellets, colorants, stabilizers lubricants, etc) are processed in an extruding machine 302 (that implements a process 104) under controlled process conditions (such as temperature, pressure, flow, etc.) to produce a product 106, specifically, plastic dowels 304, as shown. Examples of the controlled process conditions could include melt materials thoroughly, mix materials uniformly, heat extrusion mechanism to preset temperature, maintain pressure through out extrusion, cool to desired temperature, and so forth. The product (dowels 304) in this example would be produced to have specifically desired properties, such as, for example, color of the dowel, weight per standard length, stiffness, tensile strength, etc.

In the general case, the actual product properties of a product produced in a process are determined by the combination of all the process conditions of the process and the raw materials that are used in the process. Process conditions can include, but are not limited to, the properties of the raw materials, the process speed, the mechanical manipulation of the process equipment, and the conditions within individual operations of the process, among many others. As mentioned above, the extrusion of a plastic dowel may be referred to as a longitudinal or bulk manufacturing process due to the relative insignificance of any latitudinal process or product considerations, i.e., due to the homogenous nature of the product in any direction other then the direction of manufacturing. Further examples of longitudinal or bulk products include liquids such as chemicals or petroleum products, solid particles of various sizes from polymeric raw materials to cement, or any other product where the properties have little or no cross manufacturing direction variability, and that can be considered homogeneous when measured over small increments of manufacturing time. The desired properties of the plastic dowel can be based on time or the relative product position in the manufacturing process.

Quality and Process Conditions for Web-based Process Control

For the case of a process specifically designed to produce a web or sheet based product there are both longitudinal and latitudinal considerations related to the raw materials, the manufacturing process, and the product properties. Web-based product properties are similarly determined by the combination of all the process conditions of the process and the raw materials that are used in the process. Web-based products can require that dimensional (i.e., 2 dimensional) considerations be given to the raw materials as part of the process being controlled. The previous example of a manufacturing process to produce plastic dowels can be compared to a corresponding manufacturing process for the production of a continuous plastic sheet or web 402, as illustrated in FIG. 4.

A simplistic generalization can be made that the manufacturing processes for the production of a plastic dowel and for the production of a plastic sheet involve approximately similar process component functions affecting the raw materials with corresponding manipulations of temperature, pressure, flow, etc., over time. The resulting products (e.g., dowels 304 and sheets 402) differ with respect to their desired product properties and how the process conditions are controlled to achieve the desired properties. Note that the plastic sheet manufacturing process and its product properties differ from the plastic rod manufacturing process and its product properties due to the (two-) dimensional nature of the processes and properties. Like the extruded plastic rod, the desired properties of the plastic sheet can be measured based on its position in the manufacturing process and can be referenced by time; however, the web-based plastic sheet must also have measurements of its manufacturing process and its product properties in the latitudinal directions.

For typical web manufacturing processes producing web-based products, the latitudinal dimension for a process condition or a product property is referenced perpendicular to the direction of manufacturing. This position reference perpendicular to or across the manufacturing direction is typically referred to as the cross direction position or CD position, while the product property position referenced to the manufacturing direction is typically referred to as the manufacturing or machine direction position or MD position, each of which is illustrated in FIG. 5. Specifically, a 1D process/product (bottom) is shown to have only an MD direction 504, while the web-based product 402 is shown to have an MD direction 504, as well as a CD direction 502, which may be seen to be perpendicular to the MD direction 504, i.e., to the direction of motion or travel.

Measuring Process Conditions and Product Properties.

As described above, there are specific steps in a generalized process control strategy that require measurements of process conditions and measurement of product properties, however, there are manufacturing process measurements and product property measurements that can be difficult to obtain due to the inherent nature of the physical measurement, the location at which the desired measurement must be taken, or the time needed to procure an accurate measurement. In other words, certain process condition measurements can be difficult to reliably acquire due to location, environment, accuracy or other considerations that limit the usefulness of the process condition data in a process control system or strategy, and various product property measurements data can be difficult to acquire do to similar considerations. Product property measurements have an additional constraint on their usefulness associated with the time required to produce an accurate and reliable measure of the specific product property. It is not uncommon for property measurements of certain products to require hours, even days or weeks before an accurate product property measurement is available, e.g., product properties involving physical performance or destructive testing such as strengths, shelf life, wear, color fastness, etc.

The economic viability of a manufacturing operation can be critically dependant on the timely availability of accurate process condition measurements and product property measurements. The inability to obtain accurate and timely measurements can affect the efficiency of the manufacturing process as well as the quality of the products produced.

Web-Based Measurements

It can thus be appreciated that the dimensional nature of web-based process conditions and web-based product properties that have the additional requirement of cross manufacturing direction measurements associated with any point in time, requires unique consideration.

FIG. 6 illustrates a typical web-based product 402 and the relative dimensions related to the raw materials and the web-based manufacturing process, as well as a comparison of product property measurement considerations that can arise from the need to measure the same product property on two products made from roughly similar raw materials, but produced through different manufacturing processes, specifically longitudinal or bulk (e.g., dowel production), and web-based (sheet production).

Referring to the previous examples of the extruded plastic dowel and the extruded plastic film, a comparison of the two indicates that the web-based product may require additional measurements of the same desired property across the web-based product at a specific instant in time to characterize the desired product property, as compared to the characterization of the longitudinal or bulk product. In other words, as may be seen in FIG. 6, the dimensional nature of a web-based product generally requires more measurements to provide a similar level of process condition and product property measurement or characterization. Referring to FIG. 6, a measured product property (PP), for both the dowel product 304 and the web product 402 taken at times $T_1$ and $T_2$ are represented by respective labels. For the longitudinal or bulk product, there is only one measurement, per time, e.g., PP $T_1$, which denotes Product Property (PP) at time $T_1$. For the Web-based product, there are multiple measurements per time, PP $T_1CD_1$, which denotes Product Properties (PP) at time $T_1$ at position $CD_1$, PP $T_1CD_2$, and so forth, for each CD position across the product web. As also shown, such cross direction measurements are also made for these CD positions at time $T_2$. Improper or incomplete measurement of the desired property across the product web (i.e., at the various CD positions) can result in improper or incomplete adjustment of process conditions targets and a product of lesser quality and value. As is well known in the art of web-based product manufacturing, the total width of the manufacturing process and the product can be segmented spatially into smaller individual increments of the cross manufacturing direction width to facilitate higher resolution measurement and control of the process conditions and product properties. Each of these individual spatial segments of the manufacturing process produces a corresponding spatial segmentation in the product, e.g. longitudinal bands or strips running along the web product (in the time or manufacturing direction) associated with or defined by corresponding CD positions, e.g., the respective $CD_n$ positions at any or all time or manufacturing direction points. For example, a strip of the product running along the near edge of the product may be referred to as CD zone 1, profile zone 1, data box 1, or simply $CD_1$. Thus, all the $CD_1$ measurements that are made in or taken near the front edge may be considered as being spatially contained in CD zone 1 or as being from that particular CD zone. It should also be noted that different measurements reported as being made at a particular CD position, e.g., $CD_1$, may not be taken from exactly the same position, e.g., due to the spatial requirements of some sensors. In other words, a set of measurements may be made within some particular CD zone, e.g., in a cluster within that zone or strip, and may be considered to be at that location. Similarly, as described below, actual measured data may be used to synthesize additional data (e.g., via interpolation, extrapolation, etc.) associated with particular CD positions, even if the actual measured data were not taken from those exact positions.

For many web-based products, there are important product properties that relate to the final end use and quality of the product and thus require additional, or subsequent, product property measurements in order to be acceptable. For example, the printability of paper may not be known (as it is being produced on a paper making machine), until it is shipped to a printer for testing. It is also common in the case of web-based products that some important web-based product property (or properties) cannot be measured directly. For example, some important properties may relate to the rate of variance of a property, i.e., may be based on minute differences that are spatially adjacent. In other words, the product's value or quality, and thus, the product's acceptability, may relate to the magnitudes of spatially adjacent product properties as they vary across the product. As an example, a thickness variance of 1 millimeter in sheet glass that occurs over a meter may not be noticeable, while that same variance over a centimeter may produce a noticeable distortion in the glass's transmissivity, e.g., a visible "ripple", and so may result in an unacceptable product.

Having these spatially dependent measurements across a web-based product would improve the overall control of the process conditions and/or product properties. Moreover, it may be beneficial for these measurement data to be spatially coherent, where, as used herein, the term "spatially coherent" refers to data that preserve their spatial relationships, e.g., that have associated position data whereby such spatial distribution may be preserved, or that are organized in such a way that preserves the spatial relationships or relative distribution of the data, e.g., the spatial relationships of the measurements (actual or synthesized). It should be noted that "spatially coherent" does not mean that the positions of the data are necessarily regularly spaced, or in any particular arrangement, but only that the spatial distribution of the data or spatial relationships among the data (which could be randomly distributed) are preserved, although such regular spacing is certainly not excluded.

Note that as used herein, the terms "array", "array data", "spatial array data" and "spatially coherent data" may be used to refer to data sets whose elements include positional information for the data contained therein, or to data arranged to preserve the positional information, not to the particular type of data structure used to store the data.

The same requirement for multiple measurements applies to web-based manufacturing process conditions. Referring to the previous examples of the extruded plastic dowel and the extruded plastic film, web-based manufacturing processes may require additional measurements of the same desired process condition across the web-based process at each specific instant in time to characterize the desired process measurement in a manner corresponding to the characterization of the longitudinal process, as illustrated in FIG. 7, where the process condition measurements are represented in FIG. 6 by respective labels, PC $T_1$ $CD_1$, etc., that denote Product Conditions (PC) at time $T_1$ at position $CD_1$, and so forth, for each time and CD position. Improper or incomplete measurement of the desired process conditions across the process can result in improper or incomplete adjustment of process conditions and thus in a product of lesser quality and value.

There are many instances in web-based manufacturing processes where critical data from multiple measurements of process conditions or product properties occur at the same instant in time, or that are reported as having occurred at the same instant in time, e.g., stored with a single time stamp or other order denotation. These multiple process condition measurements and multiple product property measurements can be contained in a data array with an information structure that can establish the positions of the individual measurements within the array structure relative to the cross manufacturing direction position (CD) of the process condition or the product property. As noted above, within a data array, the spatial or positional relationships of the individual measurements can be maintained structurally, e.g., implicitly, via the data structure that contains the data, or explicitly, i.e., via additional information included or associated with the data.

It is also common in web based process industries that process condition and product property measurements are taken with devices that require some time to acquire or process the measurements, such as, for example, traversing measurement sensors that move across a field making a series of measurements in succession, in which case, the entire measurement data array may be reported as having occurred at the same instant in time. In other words, although the series of measurements occurred over a span of time, the resulting data array may be reported and/or stored as a measurement data array with a single order or time stamp. It should be noted that instead of including a time or order stamp, the data from successive measurements may simply be maintained (e.g., stored) in such a way as to preserve their order. In other words, the temporal ordering may be implicit (e.g., organizational), rather than explicit (i.e., including time or order stamps).

Thus, the data array can also contain information or be organized in a way that establishes the measurement position of the data array relative to the manufacturing direction (MD) or to time, which may be referred to as temporally coherent or ordered. In some web-based manufacturing processes these data arrays containing process condition measurements or product property measurements can be referred to as 'profile arrays' or simply as 'profiles'.

FIG. 8 illustrates an example of a product property measurement data array represented as cross manufacturing direction measurements (CD product property measurements) or a 'product property profile', where in this particular case, the product property is the web or sheet thickness, and where the measurements are displayed (graphically) with respect to reference CD positions 1-20. FIG. 8 also shows an example of a process condition measurement data array represented as cross manufacturing direction measurement (CD process condition measurements), in this case, a 'process condition actuator profile', where in this particular case, the process condition is the process gap or opening, and where the measurements are also displayed (graphically) with respect to reference CD positions 1-20. These types of profile data arrays are used in one form or another in most web-based process industries including, for example, paper, non-wovens, textiles, wood products, etc., among others.

FIG. 9 illustrates a typical technology used to measure web-based product properties in the cross direction, although it should be noted that other technologies may also be used. Note that an array of stationary measurement sensors 904 may be used to acquire CD measurements spanning the product's width at each specified instant of time, while traversing measurement sensors 902 make measurements serially, with a sensor 908 moving back and forth across the web 402 as the web travels along the manufacturing path, resulting in a "zig-zag" measurement pattern.

Depending on the source of the product property measurement, directly from product property measurement device within the process or from a product property measurement device subsequent to the process, the data array can be order or time stamped or otherwise marked to indicate the measurement array data's relative position in the web-based manufacturing process, its relative position within the web-based product, or its occurrence in time.

The multiple measurement data of process condition or product properties arising from web-based products must be mathematically reduced to a single 'average' or otherwise representative order or time stamp value to accommodate the limitations of current neural network modeling technology and methods.

Neural Networks as Predictors of Process and Property Measurements

Current computer fundamental models, computer statistical models, and neural network models can address certain specific process condition measurement and product property measurement deficiencies related to these physical or time constraints in certain manufacturing processes. An exemplary current neural network based approach to process measurement and control is disclosed in U.S. Pat. No. 5,282,261 to Skeirik, which is incorporated by reference below.

Currently available neural network technology can provide predicted values of process condition measurement data and product property measurement data that may not be readily measured. For example, the prior art technique referenced above requires that the input data be specifically time stamped for training and that the predicted data be specifically time stamped for further use in a controller or in a control strategy. Time stamped process condition data and product property data are considered discrete data points, in that each individual measurement data point is detached or independent from any other and clearly identified by a time stamp that can establish its position relative to the manufacturing process.

FIG. 10 illustrates a simplified exemplary embodiment of a neural network. As FIG. 10 shows, input data are provided to an input layer, including a plurality of input elements or nodes, each of which may be coupled to a plurality of elements or nodes comprised in a hidden layer. Each of these hidden layer elements or nodes may in turn be coupled to each of a plurality of output elements or nodes in an output layer of the neural network. These output nodes provide respective output data, which may be used to predict and/or control a process. As is well known in the art of neural networks, adjustable weights associated with the various node couplings are modified and set in a training phase, and subsequently determine the resulting behavior of the neural network. This existing neural network technology and method is most readily applied to longitudinal manufacturing processes, as exemplified in the extruded plastic dowel example described above.

Prior art neural network applications in process control (see, e.g., U.S. Pat. No. 5,282,261) have evolved through various computer-based modeling strategies including, for example, first principles modeling, statistical and empirical modeling; and non-conventional neural networks. The current limitations for utilizing model-based neural network applications in web-based process control require statistical averaging or manipulations of the available spatial array data that significantly reduces the usefulness of those very process condition and product property spatial array measurements.

Averaging spatial array data to produce a single data point in order to accommodate modeling limitations effectively defeats the basic purpose of using computer modeling and neural network modeling to produce measurements that are difficult to obtain. This type of data handling renders the neural network technology relatively ineffective for treating web-based measurement for process conditions and/or product properties.

Currently there are considerable deficiencies in conventional approaches to obtaining desired measurements for web-based manufacturing process conditions and web-based product properties. Specifically, there are no available methods for directly utilizing spatial array based data that are typically derived from web-based manufacturing processes, nor are there well-defined web-based product properties for modeling and predicting desired measurements of process conditions and product properties. Web-based manufacturing processes and products thus present a unique challenge to existing neural network technologies due to the need to accommodate array based measurements that are referenced in both the manufacturing direction and the cross manufacturing directions, as well as in time.

SUMMARY OF THE INVENTION

Various embodiments of a computer-based neural network process control system and method capable of utilizing spatial array based input data (i.e., spatially coherent data) for the prediction of spatial array based process conditions and/or product properties (i.e., spatially coherent predicted process conditions and/or product properties) are described. In this approach, a trained neural network utilizing spatially coherent input data produces a spatially coherent array of predicted values of process conditions and/or product properties that cannot be readily measured. The predicted values, including their spatial relationships or distribution, may be stored in a data network, e.g., in a historical database, and supplied to a controller used to control a web based process for producing a product, or presented to a process operator for use to control a process for producing a web or sheet based product.

The computer neural network process control system and method may incorporate data in array forms, and optionally in discrete forms as well, where the data may be from multiple databases and/or from other data sources that may include the manufacturing process operation, the product property testing operation, and/or product customers operation, among others.

In one embodiment, the method for controlling a process with spatially dependent conditions for producing a product with spatially dependent properties may include providing input data to a neural network, where the input data include a plurality of input data sets, each including values for a set of one or more input parameters, where each input parameter in the set includes or represents a respective process condition or product property, and where the input data preserve spatial relationships of the input data. The neural network may generate output data in accordance with the input data, where the output data include a plurality of output data sets, each including values for a set of one or more output parameters, each output parameter including a predicted process condition or product property, where the output data preserve spatial relationships of the output data, and where the spatial relationships of the output data correspond to the spatial relationships of the input data. The output data are useable by a controller or operator to control the process. In preferred embodiments, the output data are provided to the controller or operator, and the controller or operator may then control the process in accordance with the output data.

It should be noted that the spatial coherence of the input data and/or the output data may be maintained in various ways. For example, in some embodiments, the data may include position information, e.g., included in, or associated with, each data set. In some embodiments, the data may be stored in such a way that the spatial relationships among the data are maintained implicitly, e.g., via the data structure itself.

In one embodiment, the neural network may be configured by a developer who supplies neural network configuration information, e.g., the number of layers in the network, the number of nodes in each layer, the rules governing the neural network's mechanisms and evolution, and so forth. In one embodiment, the developer may easily configure the neural network using a template approach. For example, a graphical user interface may be provided whereby the developer may interactively specify the neural network architecture, as well as other details of the network's operation.

In some embodiments, the training of the neural network may accomplished using training input data having predetermined dimensional array configurations or formats for both space and time. Training may be based on discrete time-based data as well as spatial array data with or without a time base. Training array data may be compared to predicted output array data values produced by the neural network.

In preferred embodiments, a modular approach may be utilized for the neural network. For example, certain specific neural network modules may be provided based on the specific manufacturing process and desired product properties.

In preferred embodiments, the neural network may be used to control a process with spatially dependent conditions for producing a product with spatially dependent properties, e.g., to control a web-based process for producing a web-based product. The process may be operated, and process conditions and/or product properties measured at a plurality of positions to generate measurement data including measured process conditions and/or product properties, where the measurement data preserve spatial relationships among the measurement data, i.e., the measurement data are spatially coherent. Additional data may optionally be synthesized based on the measurement data. The measurement data may be provided to a neural network as an input data array, and the neural network may produce output data in response to the measurement data, where the output data include predicted process conditions and/or product properties, and where the output data have spatial relationships that correspond to the spatial relationships of the measurement data.

Controller output data may be computed using the neural network output data as controller input data in place of measurement input data, and an actuator array controlled based on the controller output data to change a controllable process state using the actuators in accordance with the controller output data. This process of operating, providing, producing, computing, and controlling may be performed in an iterative manner to produce the product with desired properties.

Alternatively, the output data from the neural network may be provided to a human operator, who may then manually control the process, e.g., by controlling an actuator array based on the output data to change a controllable process state using the actuators in accordance with the output data. As with the automatic control embodiment, this process of operating, providing, producing, and manually controlling may be performed in an iterative manner to produce the product with desired properties.

BRIEF DESCRIPTION OF THE DRAWINGS

A better understanding of the present invention can be obtained when the following detailed description of the preferred embodiment is considered in conjunction with the following drawings, in which.

Figure 1:
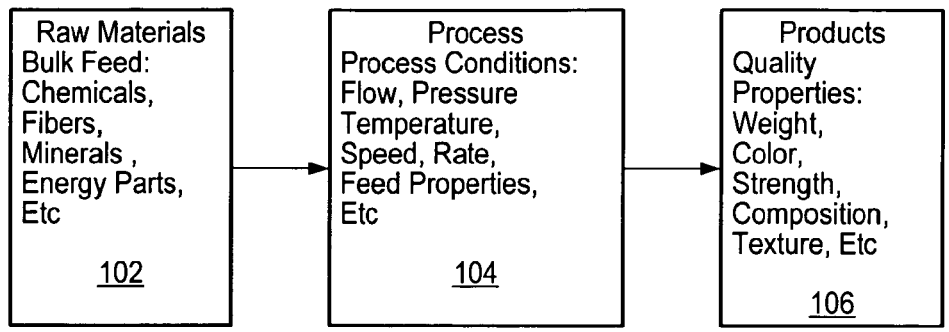
FIG. 1 is a block diagram illustrating a typical manufacturing process, according to the prior art.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF THE EMBODIMENTS

Incorporation by Reference

The following references are hereby incorporated by reference in their entirety as though fully and completely set forth herein:

U.S. Pat. No. 5,282,261, titled "Neural network process measurement and control", filed Aug. 3, 1990, issued Jan. 25, 1994, and whose inventor was Richard D. Skeirik.

Figure 11A:
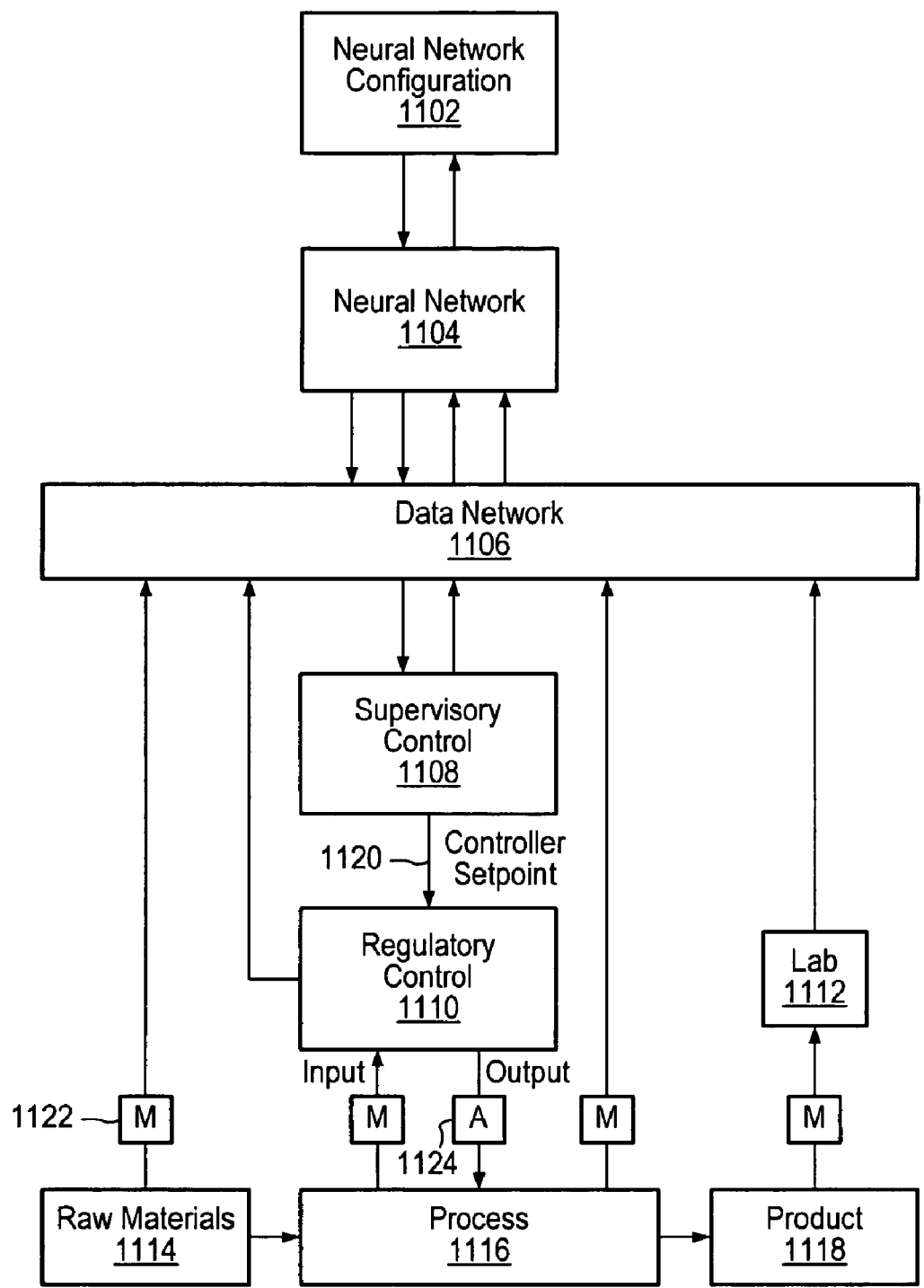
FIGS. 11A and 11B are high-level block diagrams of embodiments of a system for manufacturing process control using a neural network that utilizes spatially dependent data.
Figure 11B:
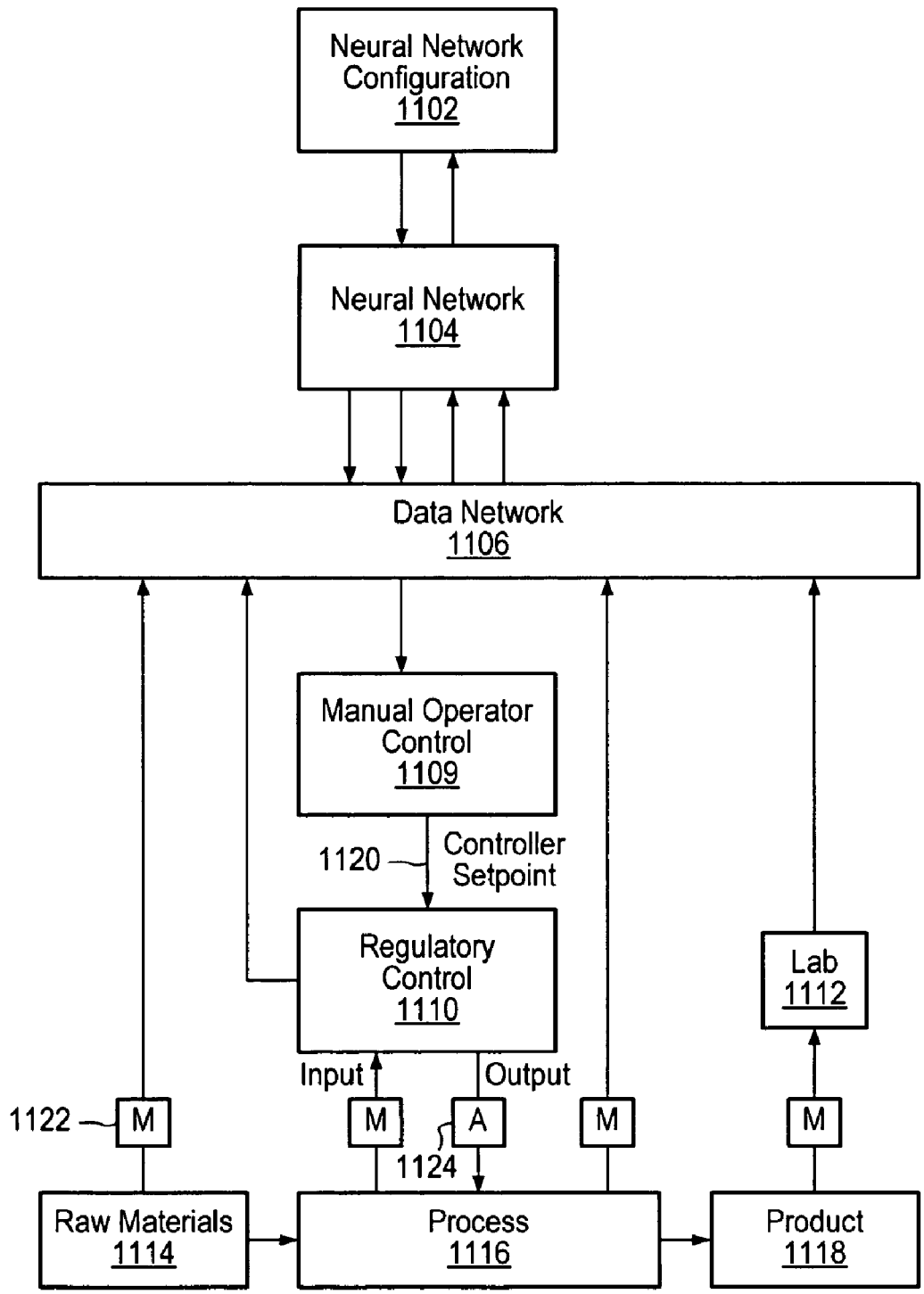

FIGS. 11A and 11B—Embodiments of a System for Process Control Using An Array-Based Neural Network FIGS. 11A and 11B are high-level block diagrams of embodiments of a system for manufacturing process control using an array based neural network. More specifically, the systems of FIGS. 11A and 11B are directed to process control of web-based (sheet-based) manufacturing using a neural network that utilizes data related to or describing spatially dependent product properties and process conditions, i.e., spatially coherent data describing product properties and process conditions. FIG. 11A illustrates a system that includes an automated controller, whereas FIG. 11B illustrates a system where a human operator manually controls the process.

Figure 2:
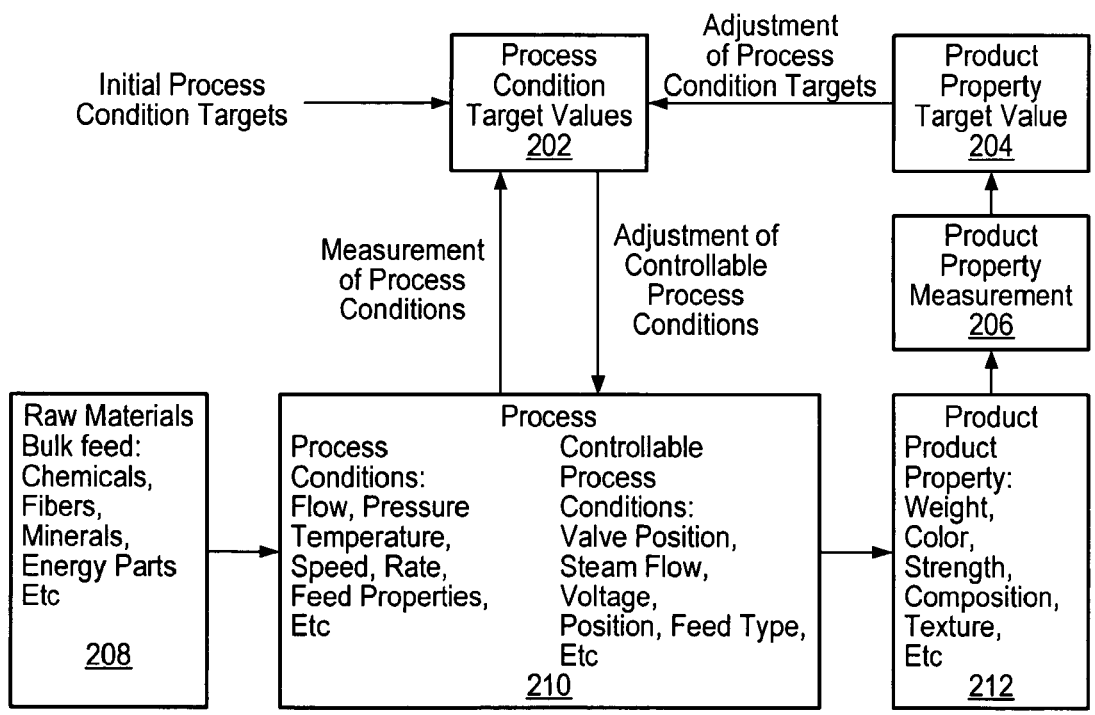
FIG. 2 is a more detailed block diagram illustrating a manufacturing process related to the production of products with specific desired properties, according to the prior art.
Figure 3:
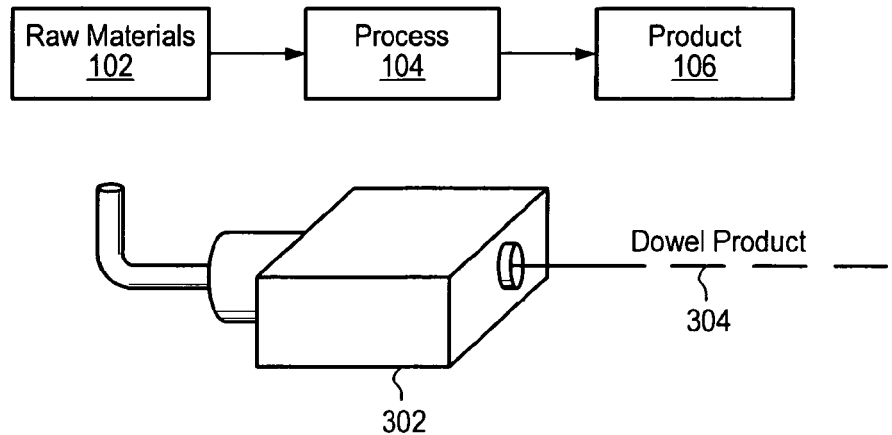
FIG. 3 illustrates a typical manufacturing process related to longitudinal or bulk production, according to the prior art.
Figure 4:
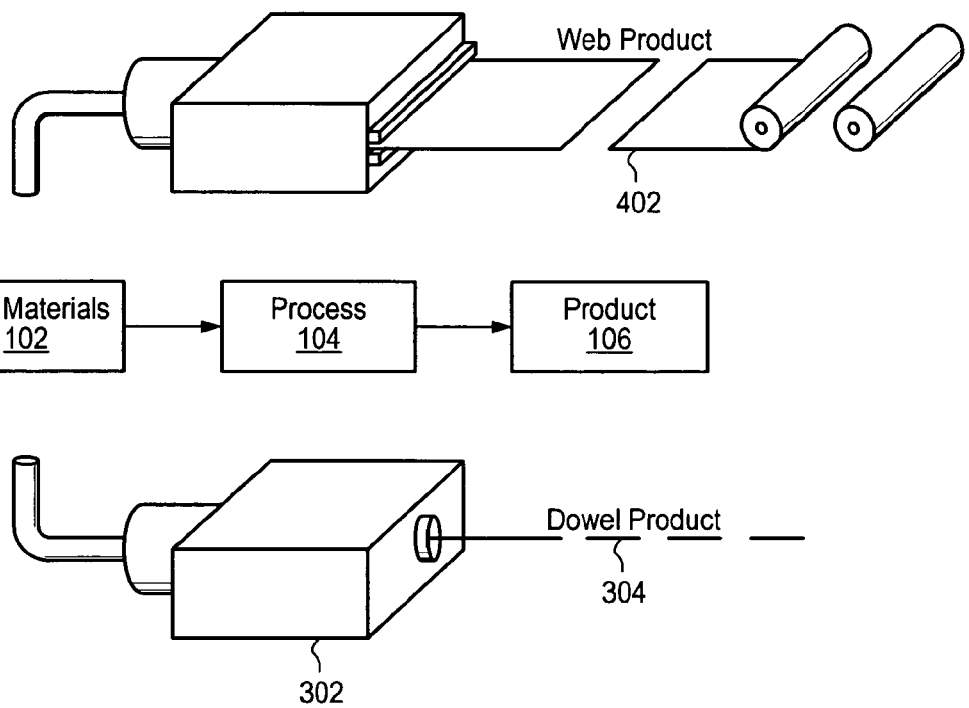
FIG. 4 illustrates a typical manufacturing process related to longitudinal or bulk and latitudinal production compared to the process of FIG. 3, according to the prior art.
Figure 5:
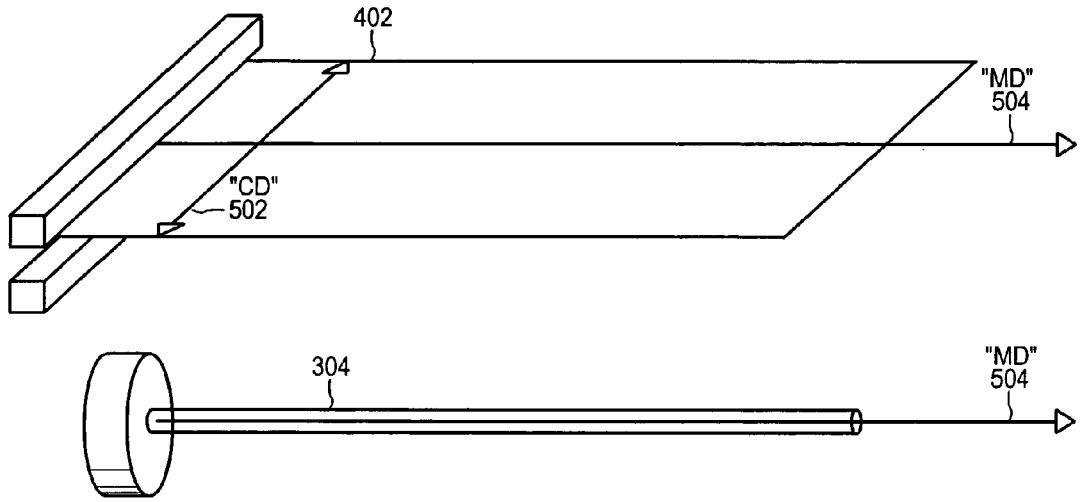
FIG. 5 illustrates manufacturing position and cross direction position, according to the prior art.
Figure 6:
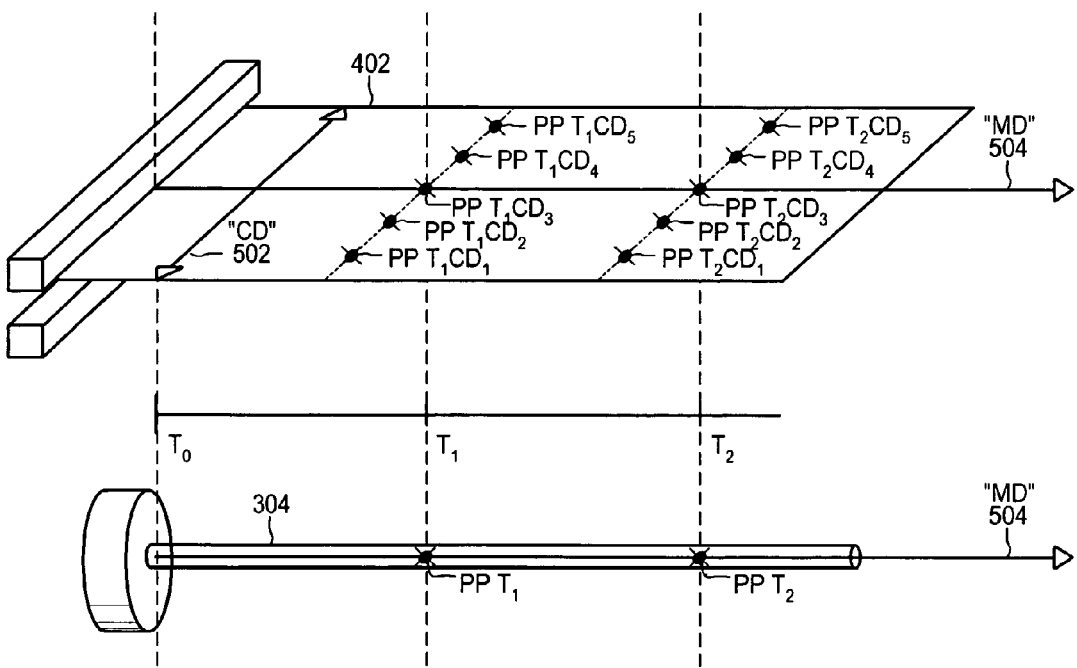
FIG. 6 illustrates a typical web-based product and relative dimensions due to the raw materials and web-based manufacturing process, compared to those of a typical longitudinal manufacturing process, according to the prior art.
Figure 7:
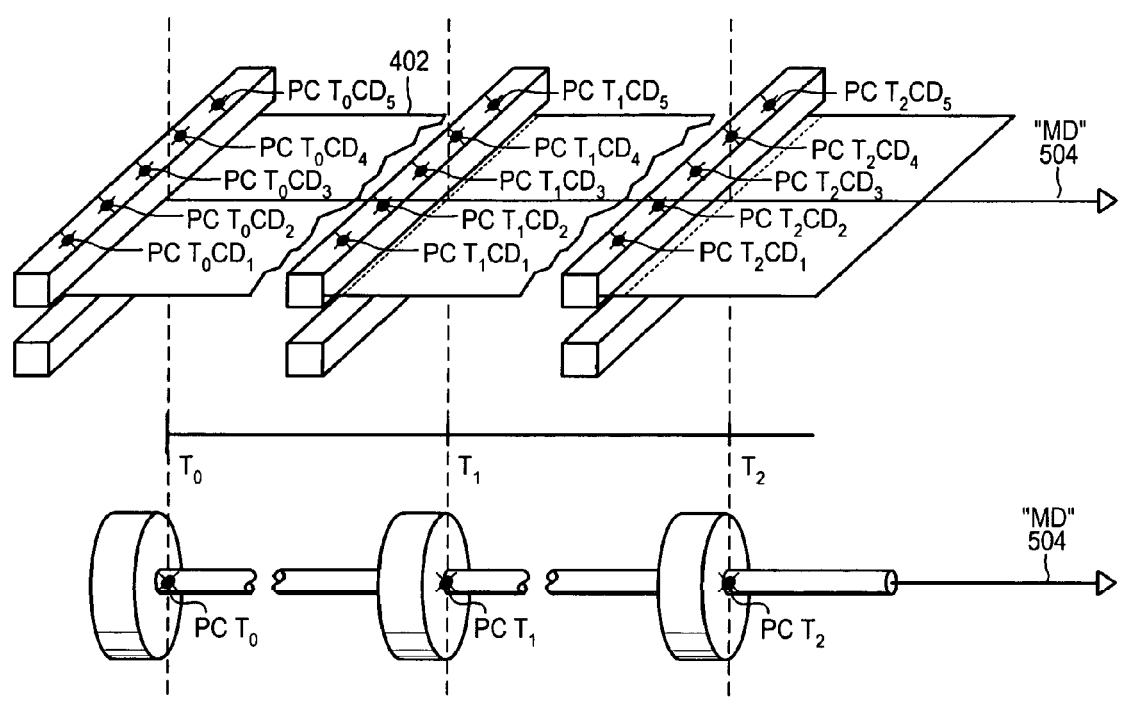
FIG. 7 illustrates measurements of the same desired process property or condition across the web-based process at a specific instance in time, according to the prior art.
Figure 8:
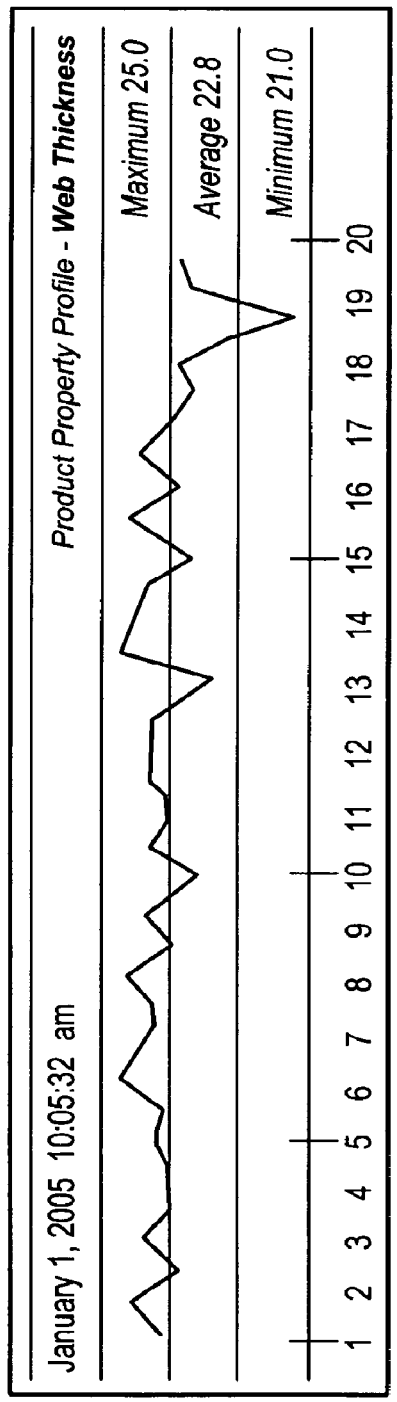
FIG. 8 illustrates cross direction (CD) product property and process condition profiles (measurement data arrays), according to the prior art.
Figure 8:
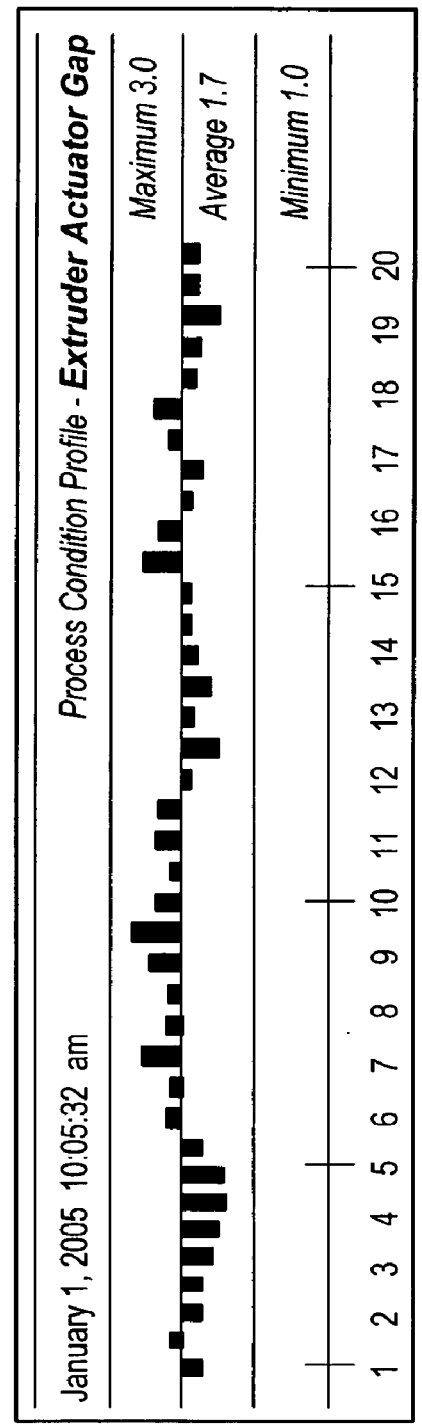
Figure 9:
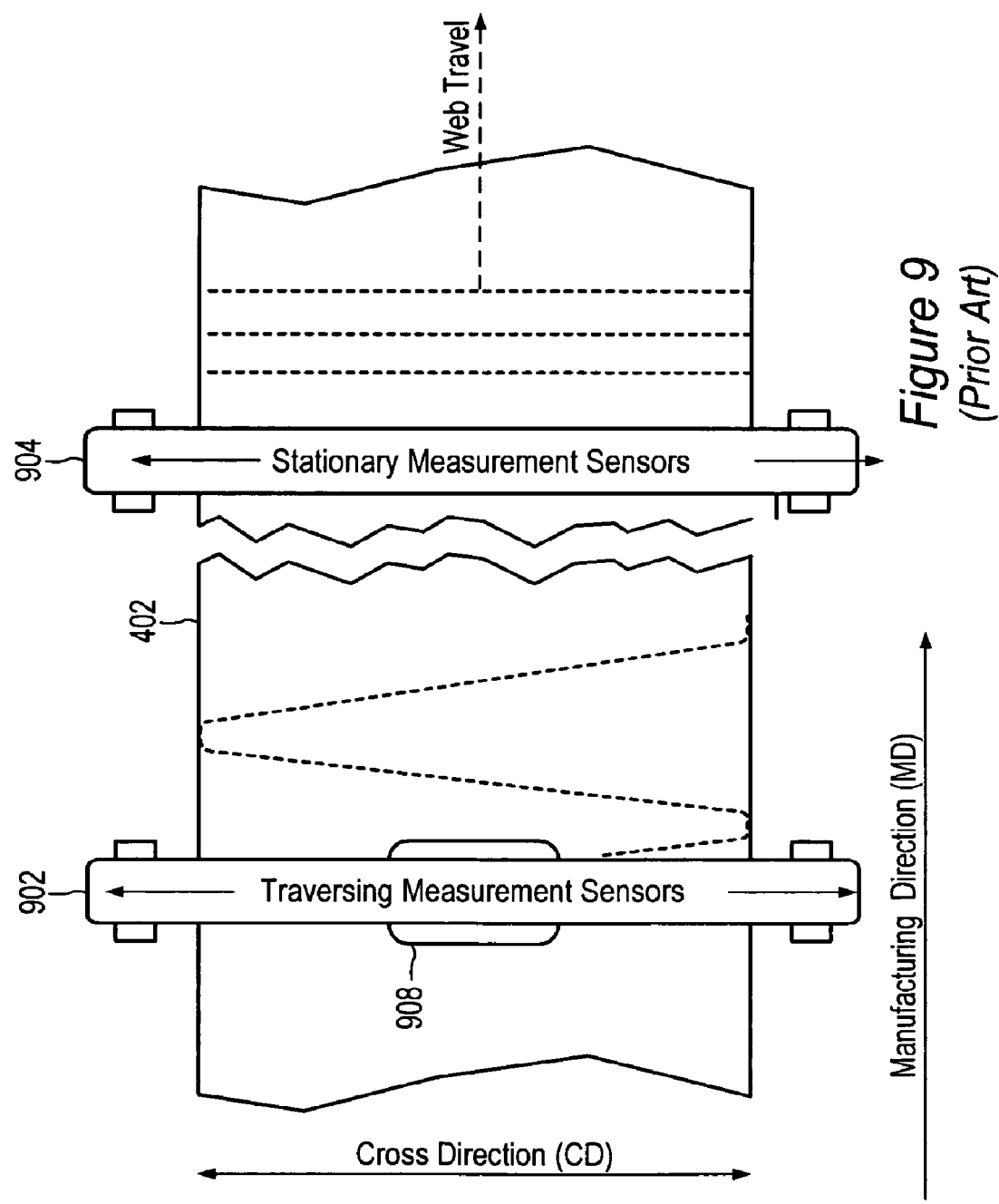
FIG. 9 illustrates a typical technology for measuring web-based product properties in the cross direction, according to the prior art.
Figure 10:
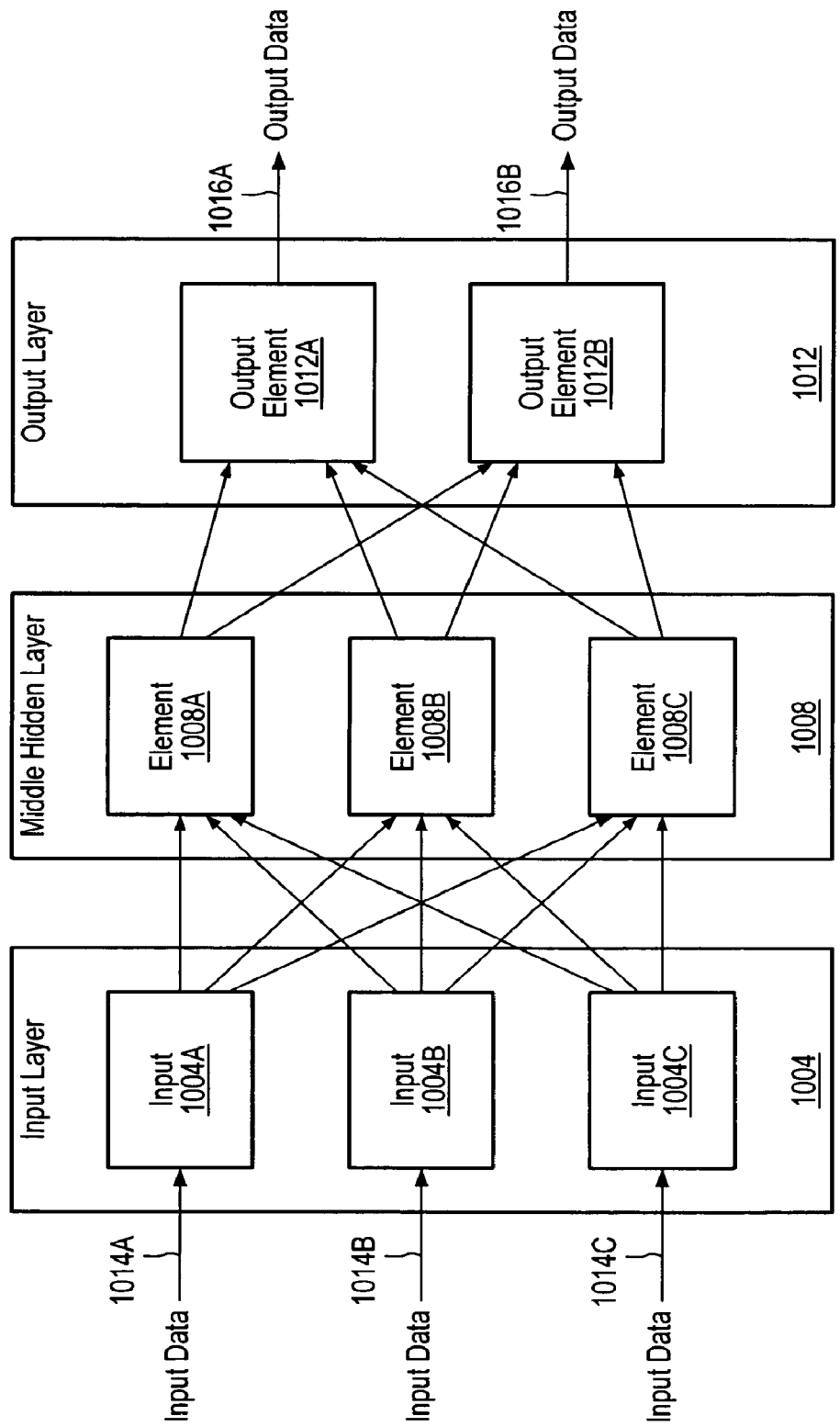
FIG. 10 illustrates a simplified exemplary neural network architecture, according to the prior art.

As is well known in the art of process control, control of processes, e.g., manufacturing processes, generally involves a feedback loop between the process, and a controller or an operator performing manual control, where measurements of various properties of the process and product are fed back to the controller, which may adjust aspects of the process accordingly to maintain or modify product qualities. In predictive process control, the controller may include or be coupled to a model of the process, and may use the model to make predictions or estimates regarding the process behavior or product qualities or properties given certain process conditions. Based on these predictions or estimates, the controller (or operator) may make adjustments to the process to affect a desired outcome, e.g., to produce products with desired properties, or to manage the process in a desired manner. An overview of a typical manufacturing process control system is provided above with reference to FIG. 2.

As FIG. 11A shows, a manufacturing process, specifically, a web-based manufacturing process 1116 that receives raw materials 1114 and produces a web or sheet product 1118, may be coupled to a process control system, e.g., comprising regulatory control 1110 and/or supervisory control 1108, data network 1106, for example, live process data feeds, historical databases, etc., and a neural network 1104, including a neural network configuration module or process 1102, according to one embodiment of the present invention. It should be noted that as used herein, the term "data network" may refer to any source or collection of sources for data related to the process or product, including, for example, single or multiple, e.g., networked, mass storage devices, live sensor data, simulations, laboratories, human operators, and so forth.

As is well known in the art of automated process control, the supervisory controller 1108 generally manages the regulatory controller 1110, i.e., determines the overall strategy, while the regulatory controller 1110 actually implements the strategy specified by the supervisory controller 1108, i.e., controls the process itself, e.g., via actuators. Note that the system of FIG. 11B differs from that of FIG. 11A only insofar as the supervisory controller 1108 is replaced with manual operator control 1109, e.g., a human operator that manually controls the process, where the manual operator control 1109 only receives information from the historical database 1106 (i.e., does not provide data to the database). Thus, the descriptions below addressed to all other aspects of the system of FIG. 11A also apply to the system of FIG. 11B.

As shown in FIG. 11A, data (represented by arrows) flow between the various components of the system, forming feedback loops that may operate to keep the components updated regarding product properties and process conditions, and to direct and determine operation of the process. As shown, information from measurements, labeled "M", i.e., measurement data 1122, which may also be referred to as sensor data, may be used to maintain currency of the data network 1106, e.g., historical database, as well as to provide process and/or product property feedback to the regulatory control system. For example, as FIG. 11A indicates, measurement data regarding the state of the raw materials and the process may be stored in the historical database 1106. Similarly, data characterizing the product 1118 may also be provided to the historical database 1106. In the embodiment shown, the product data may be provided to a laboratory 1112, which may analyze or otherwise process the data and provide the results to the data network 1106 (e.g., historical database). Note that in some embodiments, the product itself may be provided to the laboratory 1112, which may analyze the product, e.g., to characterize the product with respect to desired properties, and provide the results to the data network 1106 (e.g., historical database).

Conversely, information directed to actuator control 1124, labeled "A", may be provided by the regulatory controller 1110 to the process 1116, thereby driving or specifying actuator behavior for the process 1116. Note that the term "actuator" may refer not only to mechanical effectors, but also to any means used to control the manufacturing process, e.g., mechanical, electrical, hydraulic, optical, logical, etc. As FIG. 11A also shows, information may also be communicated between the neural network 1104 and the neural network configuration module 1102, e.g., to configure and/or train the neural network 1104, as well as between the neural network 1104 and the data network 1106, e.g., the historical database, e.g., for training the neural network, populating the historical database with predicted or estimated values, providing live data from the process to the neural network, etc.

In a preferred embodiment, the system uses spatially coherent data, e.g., in the form of a spatial data array, from the suitably designed and configured neural network 1104 to replace process spatial data measurements or laboratory spatial data measurements as input to a controller (1108 of FIG. 11A) or control strategy (e.g., implemented by an operator 1109 of FIG. 11B), or as set points to a controller or control strategy. One embodiment of such a neural network is described in detail below. The neural network 1104 may use readily available and reliable process condition measurements and product property measurements from the process 1116 or from subsequent product property measurements as input data, and may produce predicted spatially coherent data values of process conditions and/or product properties as output data. In some embodiments, the neural network may utilize synthesized or computed input data. For example, in cases where input data are incomplete, additional input data may be determined, e.g., based on those data that are available, e.g., via interpolation, extrapolation, or more sophisticated processing or modeling. In some embodiments, models may be used to derive values of additional parameters based on those parameters that can be measured. In some embodiments, the input data may be pre-processed prior to providing the data to the neural network, e.g., to remove and/or replace unusable or invalid data (e.g., outliers) with valid data, put the data into a more usable form, or otherwise manipulate or pre-process the data. Further details regarding these embodiments are provided below.

Thus, the neural network 1104 may receive input data in the form of a spatially coherent data set, e.g., an array of records that preserves the spatial distribution of the input data, and may produce corresponding output data, e.g., in the form of a spatially coherent set of predicted process conditions and/or product property values. These output data may then be provided as input to a controller or control strategy, as set points to a controller of control strategy, or as the set points to a manually implemented operator control strategy, as mentioned above. Note that the use of ordered or order/time stamped (spatially coherent) array data as inputs to a neural network that generates similarly spatially coherent output data rather than a neural network single point output facilitates or provides the spatially coherent predictive and control data needed to effectively control web-based manufacturing processes.

As indicated above, in some embodiments, the data network 1106, e.g., historical database(s), may be used to provide spatially dependent process conditions and/or product properties, e.g., historical spatially distributed (and spatially dependent) process condition measurement data and/or product property measurement data, to the neural network, although it should be noted that data from other sources may also be used as desired, including live feeds from the process, laboratory, etc., synthesized data, and so forth.

In some embodiments, when new data are added to the data network, e.g., historical database(s), additional training of the neural network 1104 may be performed to maintain currency of the neural network 1104, i.e., to keep the operational behavior of the neural network 1104 up to date. The historical database(s) and processes used to manage the databases(s) may be referred to as "historians". In one embodiment, new data provided to the historians may automatically initiate retraining, which may occur on-line and in real time, or off-line, as desired.

As mentioned above, in preferred embodiments, the output of the system and methodology may be incorporated into automatic control system structures, e.g., supervisory or/or regulatory, or as part of a manually initiated control procedure. In some embodiments, a modular architecture may allow the system to build multiple neural networks from multiple databases associated with a process. The system may provide control functions such as supervisory, expert, and/or statistical and analytical functionality, to support automatic and/or manual control. It should be noted that the controller or controllers used in various embodiments of the present invention may be any type of controller, i.e., may utilize any type of technology suitable for controlling the process, including neural networks, expert systems, fuzzy logic, support vector machines, and so forth, as desired.

It should also be noted that in some embodiments, other types of nonlinear models may be used in addition to, or in place of, the neural network 1104, including, for example, support vector machines, expert systems (e.g., rule-based systems), physical models, fuzzy logic systems, partial least squares, statistical models, etc.

Figure 12:
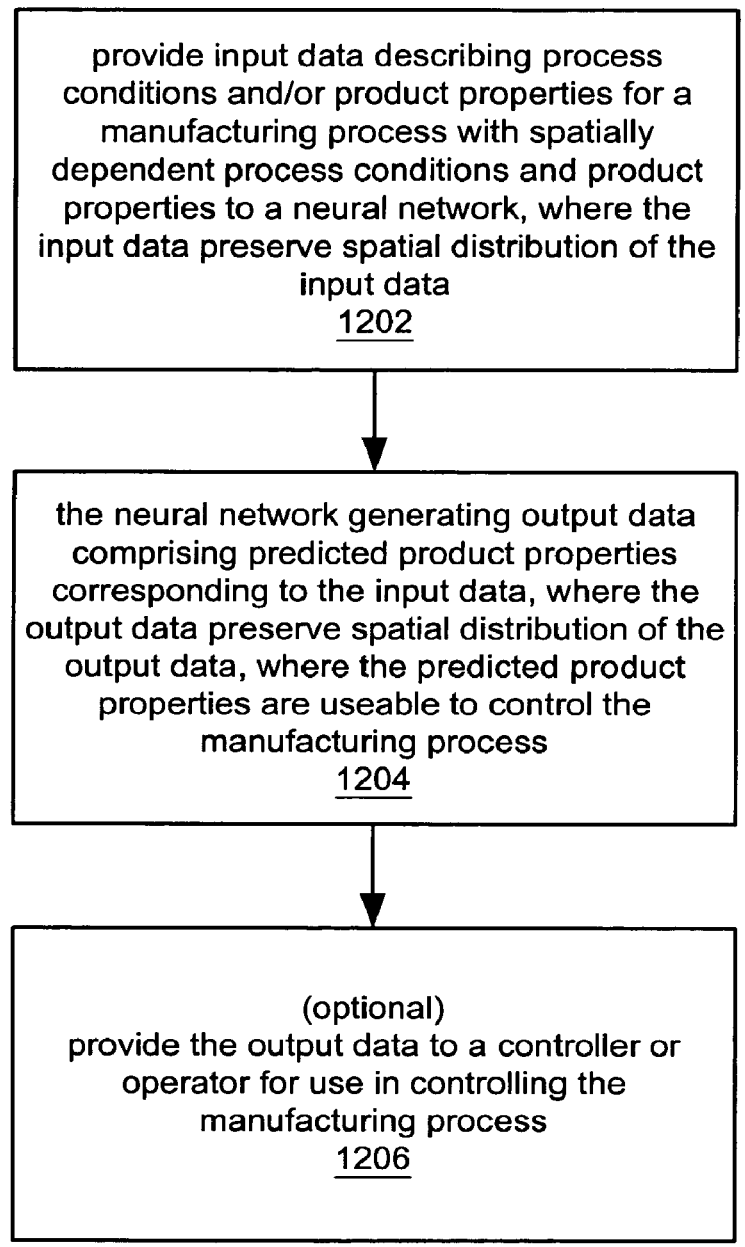
FIG. 12 flowcharts one embodiment of a method for using a neural network that utilizes spatially dependent data.
Figure 13:
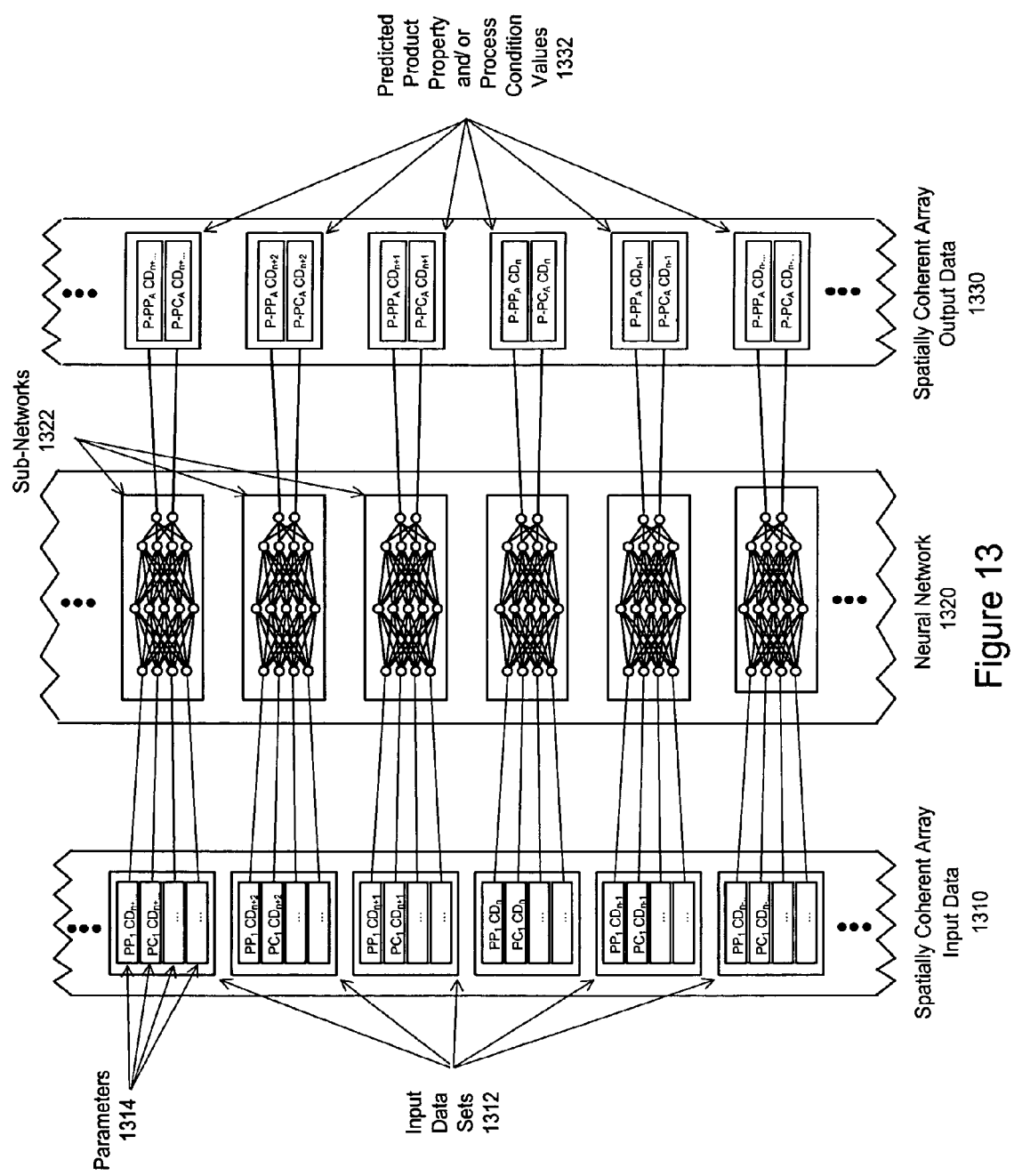
FIG. 13 is a simplified block diagram representative of a neural network that receives and produces spatially dependent data.

FIGS. 12 and 13—Method for Utilizing an Array-Based Neural Network

Turning now to FIG. 12, a high-level flowchart is presented describing a method for operating a neural network for use in process control. Note that in various embodiments, some of the method elements shown may be performed concurrently, in a different order than shown, or may be omitted. Additional method elements may be performed as desired.

As FIG. 12 shows, in 1202, a input data may be provided as input to a neural network, where the input data include or describe process conditions and/or product properties for a process, e.g., a web based manufacturing process that operates to produce a web based product, and where the input data preserve spatial relationships of the input data, e.g., the input data are spatially coherent. As described above, web based products may include, but are not limited to, paper, sheet (including flat and rolled product) plastic or polymer, particle-board, wood or organic composites, sheet metal (e.g., foil or thicker metal sheeting), sheet composites, sheet glass, sheet fiber-glass, laminates, textiles, and food products, such as candy and gum, among others.

The process conditions may include any attribute or aspect of the process related to the product manufacture. Example process conditions may include, but are not limited to, temperature, position (e.g., gap), pressure, humidity, voltage, and current, flow, speed, rate, feed properties (e.g., of materials), and raw material properties, among others. Example product properties may include, but are not limited to, weight, moisture content, color, strength, stiffness, composition, flatness, texture, thickness, gloss, runnability, printability, and hardness, among others. For example, the above parameters or properties may be important quality metrics for paper production, laminar products, and so forth.

As will be described below in more detail, in some embodiments, the input data may be provided in the form of multiple data sets, where each data set may include respective values for a set of input parameters, where each input parameter in the set comprises a respective process condition or product property. In preferred embodiments, each data set may include, or may be associated with, information indicating the spatial distribution of the input data. In other embodiments, the input data sets may simply be organized or arranged to preserve this spatial distribution, e.g., in a spatially coherent data structure.

Note that the input data may be provided from any of a variety of sources. For example, the input data may be obtained by measuring and/or synthesizing one or more process conditions at each of one or more spatial positions in a production line of the process, and by measuring and/or synthesizing one or more product properties at each of one or more spatial positions on the product.

As mentioned above, measurements may be made using one or more sensors operable to detect physical attributes of the product and/or process conditions, such as, for example, traversing sensors and/or static sensor arrays, although any other types of sensor or sensor configuration may be used as desired.

Data synthesis may also be performed using any of a variety of methods. For example, in the case that some measurements (of process conditions and/or product properties) are available, but not at the spatial frequency or resolution desired, interpolation and/or extrapolation (e.g., linear or nonlinear) may be used to generate the "missing" data. In other embodiments, models may be used to generate the additional data. For example, nonlinear models, such as trained neural networks or support vector machines which may operate to model data sets under specified constraints, may receive the available measurement data as input, and may generate the additional data as output.

In some embodiments, the additional data may include values of the same parameters measured but at positions where such measurements were not made, e.g., may be "interstitial" data (e.g., interpolated), or extended data (e.g., extrapolated), such as temperature values for regions not covered by sensors. In some embodiments, the additional data may include values of parameters that may not be directly measurable, but that may be derivable from measurements. For example, assume that temperature and pressure are measured process conditions, e.g., in an enclosed portion of the product line, but that moisture content is (for some reason) not measurable in this region. Assume that the composition of the product is known. A first principles model based on the relationship between temperature, pressure, and moisture content, may then be used to generate the moisture data.

In 1204, the neural network may generate output data, where the output data include or describe predicted or estimated product properties, and where the output data preserve spatial distribution of the output data, e.g., preserve spatial relationships among the data, e.g., via included or associated position information, or via a spatially coherent data structure. For example, in a paper manufacturing process, data describing process conditions such as temperature, position (e.g., gap), pressure, material feed rates and mixes, etc., may be provided to the neural network, which may then predict a resulting product property, such as for example, the paper's moisture content, thickness, etc. In preferred embodiments, the predicted product properties are useable to control the manufacturing process.

One embodiment of a neural network suitable for implementing embodiments of the present method is illustrated in FIG. 13, although it should be noted that the neural network architecture shown is meant to be exemplary only, and that other neural network architectures may be used as desired. FIG. 13 indicates the dimensional or spatial requirements pertaining to web based manufacturing processes and web based products as regards the need to consider the spatial relationships of process condition measurements and/or product property measurements with respect to their position in the process (i.e., in time or with respect to the manufacturing direction or MD and with respect to the cross manufacturing direction or CD) and with respect to the their position in the product (i.e., in time or with respect to the manufacturing direction or MD and with respect to the cross manufacturing direction or CD).

As FIG. 13 shows, in this embodiment, spatially coherent input data 1310 are provided as input to a neural network 1320, which produces as output spatially coherent output data 1330. In the embodiment shown, the input and output data are in the form of data arrays. Note that the number of elements shown in each array is meant to be exemplary only, and is not intended to limit the size of the arrays. Note also that while the term "array" is used herein, any type of data structure that preserves the organization of the data may be used as desired, as mentioned above.

As indicated in FIG. 13, the spatially coherent input data preferably includes a plurality of data sets, each including values for a set of input parameters 1314, where, as described above, each input parameter describes, corresponds to, or includes, a respective process condition or product property for a respective spatial position. For example, as one example relating to paper production, each data set may include a parameter value describing the process temperature at a respective point relative to the manufacturing process, e.g., relative to the manufacturing direction or MD as described above, and also associated with a particular position on the product relative to the cross manufacturing direction, i.e., the CD, at a particular time. The data set may also include one or more values for parameters describing properties of the paper at that position, such as for example, the paper's moisture content, thickness, and so forth. The input data are preferably ordered or time stamped with a value indicating or representative of the order or time at which the data originated, e.g., the time of measurement, which in some cases, such as when traversing sensors are used, may be an average, median, initial, etc., time of the measurement times (or MD positions) performed during the traversal. Alternatively, the input data may simply be stored and used in an ordered manner such that explicit order or time stamping is not required.

As FIG. 13 shows, in this exemplary embodiment, the spatially coherent input data include multiple (in this particular example embodiment, six or more) input data sets, each including one or more product properties at a respective CD position, labeled "$PP_1\ CD_n$", and one or more process conditions at the respective CD position, labeled "$PC_1\ CD_n$", where the subscripts "n", "n+1", etc., denote the distinctness of each respective CD position, and may also indicate the spatial order of the data sets. Boxes with ellipses denote additional parameter values in the data sets, e.g., additional process conditions and/or product properties, although it should be noted that in various embodiments, the data sets may each include one or more process condition values and/or one or more product property values, i.e., the number of parameters shown in each data set is for illustration purposes only, and is not intended to limit the input parameters to any particular number or type. The vertical dots at the top and bottom of the input data 1310, neural network 1320, and output data 1330, indicate that additional elements of each may be included, e.g., additional input data sets 1312, additional output data sets, and so forth, as desired.

It should also be noted that in some embodiments, in addition to the spatially coherent input data, a single or average data value may also be provided as input to the neural network. For example, one or more single or average data values may be provided corresponding to or representing one or more general process conditions or product properties, e.g., properties or conditions that are not specific to any particular position but are representative of all positions as a statistical or otherwise representative average.

As noted above, the neural network 1320 may have any of various architectures. For example, in some embodiments, the neural network 1320 may be a single network, e.g., may have a monolithic architecture. Alternatively, as indicated in FIG. 13, in some embodiments, the neural network 1320 may include a plurality of sub-networks 1322, i.e., sub-neural networks. For example, in the embodiment shown, the neural network 1320 includes a respective sub-network for each data set included in the input data. As also indicated in FIG. 13, each sub-network 1322 may have input nodes corresponding respectively to the input parameters of a data set. In some embodiments, a sub-network 1322 for a specific set of input parameters 1314, e.g., product property $PP_j$ for a specific time (e.g., $PP_j\ T_m$) at a specific location (e.g., $PP_j\ T_m CD_n$), may interact with adjacent or locally adjacent sub-networks. In other words, in some embodiments, the sub-networks may be interconnected with adjacent sub-networks (or even with their neighbors, and so forth). Note that the sub-networks shown are only meant to be generally representative, and are not intended to represent actual sub-network architectures. Following the paper production example above, each sub-network may have input nodes for temperature, paper moisture content, and paper mass, and so forth. Thus, each sub-network may correspond to a spatial position for which process condition and/or product property values are provided (via measurement or synthesis).

Each sub-network may operate to receive these parameter values, and as indicated, may generate respective one or more predicted product property and/or process condition values 1332. As FIG. 13 indicates, in this exemplary embodiment, the spatially coherent output data include multiple (in this particular case, six or more) output data sets, each including one or more predicted product properties at a respective CD position, labeled "$P\text{-}PP_A\ CD_n$", and one or more predicted process conditions at the respective CD position, labeled "$PC_A\ CD_n$", where, as noted above, the subscripts "n", "n+1", etc., denote the distinctness of each respective CD position, and may also indicate the spatial order of the data sets.

For example, following the same paper production example, each sub-network may provide a predicted value for the paper's moisture content corresponding to the input parameter values (temperature, mass, thickness, production rate, etc.), as well as (in this particular example embodiment) a respective predicted process condition, such as, for example, humidity (e.g., due to evaporation from the product). As mentioned above, the output data may be arranged or included in a spatially coherent output array 1330, and/or may be output with position information preserving the spatial distribution of the data. Note that in this particular embodiment, due to the correlation between the input data, the sub-networks, and the output data, the neural network 1320 may itself be considered to be spatially coherent, e.g., in a logical sense. For example, each respective input data set, sub-network, and output data set, may correspond to a respective CD zone, profile zone, or data box, with respect to the product.

Thus, the neural network may generate spatially coherent output data in accordance with the input data, where the output data comprises spatially coherent values for an output parameter comprising a predicted process condition and/or product property. As noted above, in preferred embodiments, the output data are useable by a controller or operator to control the process.

As shown in 1206, the predicted product properties, i.e., the spatially coherent output data, may optionally be provided to a controller or operator for use in controlling the manufacturing process. For example, referring back to FIGS. 11A and 11B, the predicted product properties may be used by or stored in the data network 1106, e.g., may be stored in the historical database, and then may be retrieved, e.g., by the supervisory controller 1108, which may determine a strategy for achieving desired product properties, or by an operator 1109, which may indicate this strategy to the regulatory controller 1110, which may in turn implement the strategy by controlling actuators in the process.

Figure 14A:
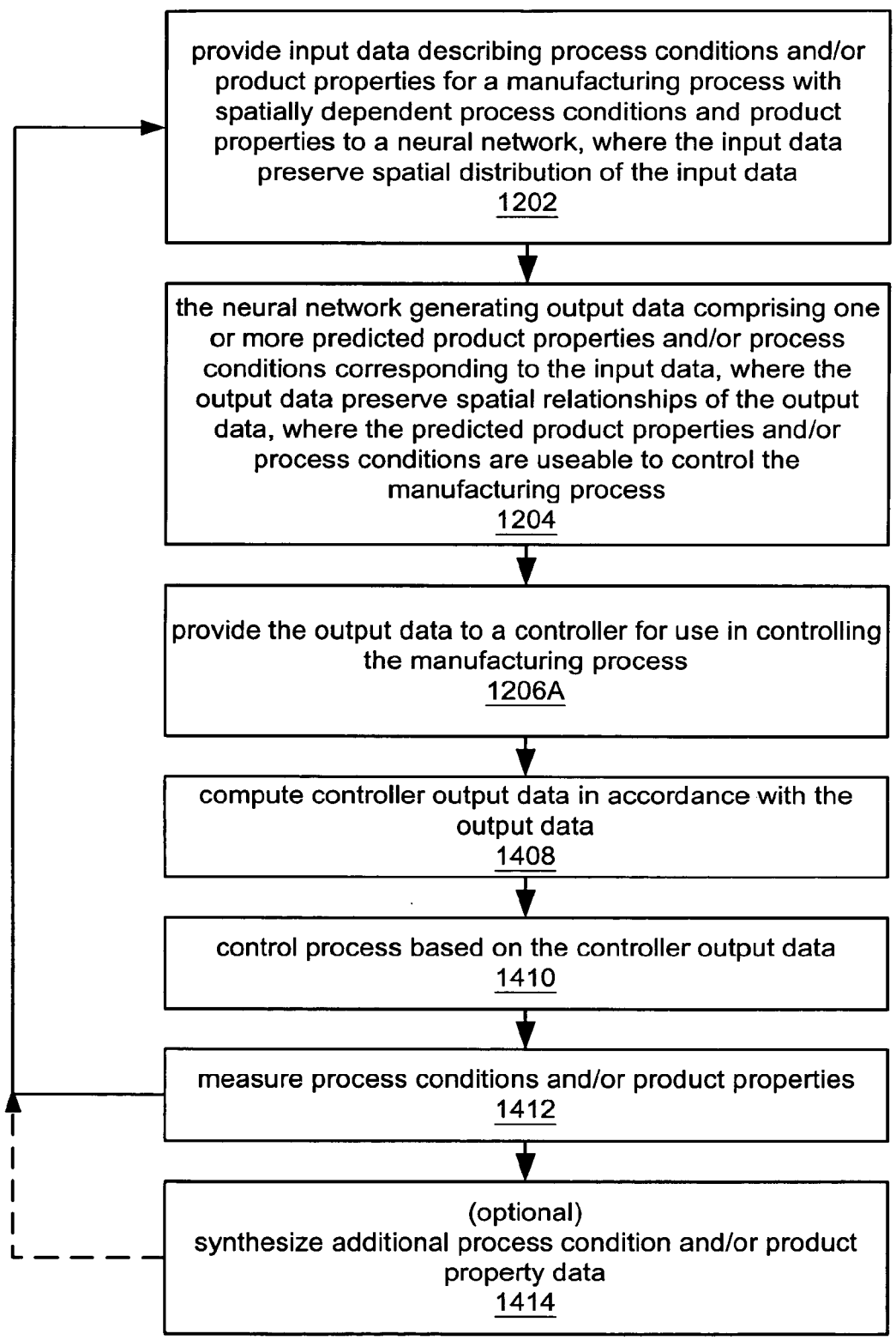
FIGS. 14A and 14B flowchart embodiments of a method for controlling a manufacturing process with a neural network that uses spatially dependent data.
Figure 14B:
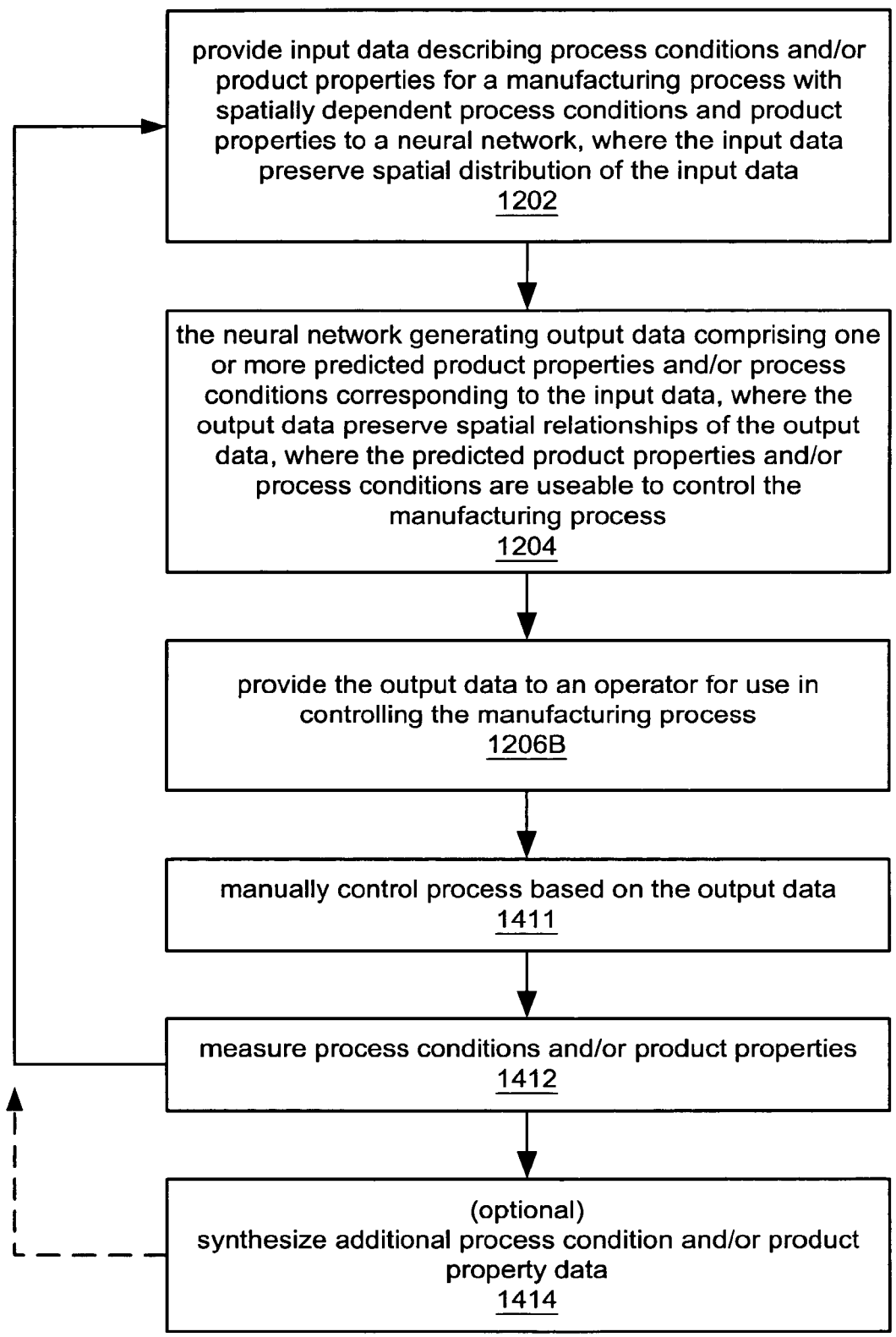

FIGS. 14A and 14B—Methods for Controlling a Process Using a Neural Network FIGS. 14A and 14B are high level flowcharts of methods for controlling a process, e.g., a web-based manufacturing process, using a neural network, according to various embodiments of the present invention. More specifically, the method of FIG. 14A relates to automatic control of the process, e.g., via the use of a controller, while the method of FIG. 14B relates to manual control of the process, e.g., by a human operator.

As noted above, in various embodiments, some of the method elements shown may be performed concurrently, in a different order than shown, or may be omitted. Additional method elements may be performed as desired. Note that where method elements have been described earlier, the descriptions below may be abbreviated.

As FIGS. 14A and 14B show, method elements 1202-1204, described in detail above with reference to FIG. 12, involve providing input data, e.g., measurement and/or synthesized data related to process conditions and product properties, to a neural network where the input data has a spatial dependence or distribution (1202), the neural network generating output data based on the input data, where the output data have a spatial dependence or distribution corresponding to that of the input data (1204).

As FIG. 14A shows, in 1206A, the output data may be provided to a controller for use in controlling the manufacturing process.

As FIG. 14A also shows, in 1408, controller output data may be computed in accordance with the provided output data of 1206A. For example, as the provided output data comprise predicted values for product properties, the values may be compared to desired or target product properties, where the differences between the predicted values and the desired or target values may be considered errors, as is well known in the art of predictive process control. Corresponding adjustments may be determined that are intended to correct for these errors. In other words, controller output data may be computed that attempts to modify the process conditions of the process in such a way as to improve the resulting product properties, i.e., to move the properties toward the target values. Note that in embodiments where an automated controller is used, these computations may be performed automatically, e.g., by supervisory controller 1108 via such technologies as neural networks, support vector machines, expert systems, fuzzy logic, etc., as desired.

As FIG. 14A further indicates, in 1410, the process may be controlled based on the controller output data. For example, the controller output data may be used to control an actuator array to change a controllable process condition or state of the process in accordance with the controller output data. In other words, the actuator array may include a plurality of actuators, where the actuators have a spatial distribution corresponding to the spatial distribution of the input data. It should be noted that data that have corresponding spatial distributions do not necessarily have the same resolution. In other words, it may be the case that output data with a number of data sets, e.g., 256, may have a spatial distribution that corresponds to that of input data with a much larger number of data sets, e.g., 1024, in which case there are four input data for each output datum. Thus, the spatial distribution of different data may correspond, but not be at the same resolution or spatial frequency.

Alternatively, as indicated in FIG. 14B, in 1206B, the output data may be provided to an operator, e.g., a human operator for use in controlling the manufacturing process.

As FIG. 14B also shows, in 1411, the operator may manually control the process based on the output data of 1206B. In other words, in embodiments that rely on manual operator control, a human operator may use the output data from the neural network to manually and directly control the process. For example, in one embodiment, the operator may manually control an actuator array to change a controllable process state in accordance with the output data. The actuator array may include a plurality of actuators, where the plurality of actuators have spatial relationships corresponding to the spatial relationships of the input data.

As FIGS. 14A and 14B indicate, in 1412, process conditions and product properties may be measured, e.g., via sensors, such as traversing sensors and/or static sensor arrays, resulting in process condition and product property measurement data, as described above with reference to FIGS. 11A and 11B.

In 1414, additional data may optionally be synthesized to augment and/or replace at least a portion of the measurement data, as also described above with reference to FIGS. 11A and 11B.

Finally, as also shown in FIGS. 14A and 14B, the measured (and optionally synthesized) process condition and product property data may be provided as new input to the neural network, and the method may repeat as desired, controlling the process in an iterative manner to produce a product with the desired properties.

Thus, in embodiments of the methods of FIGS. 14A and 14B, because of the corresponding spatial distributions (e.g., common spatial coherence) of the input data, the output data, (the controller output data of FIG. 14A,) and the actuators, the process control may be implemented and performed taking into account the spatial nature of the product and controlling such properties accordingly. Thus, for example, if the product were found or predicted to have, say, a strip with sub-standard property along one side of the web or sheet, the controller output data may indicate that a corresponding actuator should be adjusted in such a way as to correct this problem. For example, the product's properties may be managed at the CD zone level. Thus, various embodiments of the present invention may facilitate increased subtlety and resolution in the control of web-based products.

Note that in some embodiments, the neural network may be occasionally be trained, e.g., may periodically be updated, e.g., using data that have been accumulated regarding the operation and performance of the process. For example, each cycle of the process may include storing measured data regarding the process conditions and product properties in historical databases, as described above. These data may be used to provide further training of the neural network. In some embodiments, various analyses may be performed on the data, where the results of such analyses may also be used to train the neural network.

In various embodiments, the neural network may be trained offline or online. For example, in offline embodiments, the neural network may be updated or retrained without being in direct control of or connected to the operating manufacturing process, or, in preferred embodiments, a clone of the neural network may be trained and effectively swapped out with the production neural network, e.g., two or more copies of data defining the neural network's configuration may be maintained, where an offline version is trained using the historical (or other) data, and where the production neural network may be reconfigured to reflect the training, possibly without stopping the process at all. In one embodiment, a developer may configure the neural network using a template approach. For example, a graphical user interface may be provided whereby the developer may interactively specify the neural network architecture, as well as other details of the neural network's operation.

Alternatively, or in addition to, the neural network may be trained online, e.g., may be trained while the process is in operation, e.g., via incremental training, where the neural network is modified by small amounts over the course of operation of the process.

Various embodiments of the system and method described herein may substantially ameliorate problems related to process dead time, measurement dead time, data time frequency, data spatial frequency, and measurement variability in both process condition measurement array data and product property measurement array data, and so may improve control in both the time domain, i.e., in the manufacturing direction, and in the spatial domain, i.e., the cross manufacturing direction.

Various embodiments further include receiving or storing instructions and/or data implemented in accordance with the foregoing description upon a computer-readable medium. Suitable media include a memory medium as described above, as well as any other medium accessible by a computer, and operable to store computer-executable program instructions.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A method for controlling a process with spatially dependent conditions for producing a product with spatially dependent properties, comprising:
    synthesizing, via a machine learning method, one or more process conditions at each of one or more spatial positions in a production line of a process or synthesizing one or more product properties at each of one or more spatial positions on the product to generate input data, wherein synthesizing comprises generating additional input data using nonlinear models based on historical spatial relationship data;
    providing the input data to a process control system, wherein the input data comprise a plurality of input data sets, each input data set comprising values for a set of one or more input parameters; and
    generating output data in accordance with the input data, wherein the output data comprise a plurality of output data sets, each output data set comprising values for a set of one or more output parameters, each output parameter comprising a predicted process condition or product property, wherein the output data preserve spatial relationships of the output data corresponding to the spatial relationships of the input data, and wherein the output data are useable by the process control system or an operator to control the process.

2. The method of claim 1, wherein providing the input data comprises:
    measuring one or more process conditions at each of one or more spatial positions in a production line of the process to generate the input data; or
    measuring one or more product properties at each of one or more spatial positions on the product to generate the input data.

3. The method of claim 1, comprising training the process control system using synthesized process condition data having spatial relationships corresponding to the spatial relationships of the input data.

4. The method of claim 1, comprising pre-processing the input data prior to providing the input data to the process control system.

5. The method of claim 4, wherein pre-processing the input data comprises one or more of:
    removing and/or replacing unusable or invalid data with valid data; or
    putting the data into a more usable form or format.

6. The method of claim 1, wherein the process control system comprises a plurality of sub-networks.

7. The method of claim 6, wherein each of the plurality of sub-networks corresponds to a respective data set in the plurality of data sets and each input parameter in each data set corresponds to a respective input node of a sub-network.

8. The method of claim 1, wherein synthesizing comprises one or more of:
    interpolating measured data; or
    extrapolating measured data.

9. The method of claim 1, comprising:
    providing the output data to an operator; and
    controlling an actuator array via manual input by the operator to change a controllable process state in accordance with the output data, wherein the actuator array comprises a plurality of actuators, and wherein the plurality of actuators have spatial relationships corresponding to the spatial relationships of the input data.

10. The method of claim 1, comprising:
    providing the output data to a controller;
    controlling an actuator array via the controller to change a controllable process state in accordance with the controller output data, wherein the actuator array comprises a plurality of actuators, and wherein the plurality of actuators have spatial relationships corresponding to the spatial relationships of the input data.

11. The method of claim 10, comprising performing the steps of the method in an iterative manner to control production of the product with desired properties.

12. The method of claim 11, comprising periodically updating the process control system based on measured process conditions and product properties.

13. The method of claim 1,
    wherein each input data set comprises position information for the set of input parameters, and wherein the position information indicates the spatial relationships of the input data; and
    wherein each output data set comprises position information for the one or more output parameters.

14. The method of claim 1,
    wherein the input data are provided to inputs of the process control system in a manner that preserves the spatial relationships of the input data;
    wherein the output data are provided by outputs of the process control system in a manner that preserves spatial relationships of the output data; and
    wherein the spatial relationships of the output data correspond to the spatial relationships of the input data.

15. A method for controlling a web-based manufacturing process with spatially dependent conditions for producing a web product with spatially dependent properties, comprising:
    synthesizing, via a machine learning method, one or more process conditions at each of one or more spatial positions in a production line of a web-based manufacturing process or synthesizing one or more web product properties at each of one or more spatial positions on the web product to generate input data, wherein synthesizing comprises generating additional input data using nonlinear models based on historical spatial relationship data;
    providing the input data to a process control system, wherein the input data comprise a plurality of input data sets, each input data set comprising values for a set of one or more input parameters; and
    generating output data in accordance with the input data, wherein the output data comprise a plurality of output data sets, each output data set comprising values for a set of one or more output parameters, each output parameter comprising a predicted process condition or web product property, wherein the output data preserve spatial relationships of the output data corresponding to the spatial relationships of the input data, and wherein the output data are useable by the process control system or an operator to control the web-based manufacturing process.

16. The method of claim 15, wherein providing the input data comprises:
    measuring one or more process conditions at each of one or more spatial positions in a production line of the web-based manufacturing process to generate the input data; or measuring one or more web product properties at each of one or more spatial positions on the web product to generate the input data.

17. The method of claim 15, comprising training the process control system using synthesized process condition data having spatial relationships corresponding to the spatial relationships of the input data.

18. The method of claim 15, comprising pre-processing the input data prior to providing the input data to the process control system.

19. The method of claim 18, wherein pre-processing the input data comprises one or more of:
    removing and/or replacing unusable or invalid data with valid data; or
    putting the data into a more usable form or format.

20. A system for controlling a process with spatially dependent conditions for producing a product with spatially dependent properties, comprising:
    a processor; and
    a memory coupled to the processor that stores program instructions executable by the processor to implement a process control system, wherein the process control system comprises:
    a plurality of inputs, operable to receive input data, wherein the input data comprise a plurality of input data sets, each comprising values for a set of one or more input parameters, and wherein the input data are provided by one or more of:
        synthesizing, via a machine learning method, one or more process conditions at each of one or more spatial positions in a production line of the process to generate the input data, or synthesizing one or more product properties at each of one or more spatial positions on the product to generate the input data, wherein synthesizing comprises generating additional input data using nonlinear models based on historical spatial relationship data;
    wherein the process control system is operable to generate output data in accordance with the input data, wherein the output data comprise a plurality of output data sets, each output data set comprising values for a set of one or more output parameters, each output parameter comprising a predicted process condition or product property, wherein the output data preserve spatial relationships of the output data corresponding to the spatial relationships of the input data.

* * * * *